F. STITZEL,

Assignor of one-half interest to T. H. SHERLEY.

Rack for Tiering Barrels.

No. 9,175. Reissued April 27, 1880.

Witnesses:
Franck L. Durand
Alex Mahon

Inventor:
Frederick Stitzel,
by his attorney,
Wm. H. Finnerel

N. PETERS, PHOTO-LITHOGRAPHER, WASHINGTON, D. C.

UNITED STATES PATENT OFFICE.

FREDERICK STITZEL, OF LOUISVILLE, KENTUCKY, ASSIGNOR OF ONE-HALF OF HIS INTEREST TO THOMAS H. SHERLEY.

RACK FOR TIERING BARRELS.

SPECIFICATION forming part of Reissued Letters Patent No. 9,175, dated April 27, 1880.

Original No. 221,945, dated November 25, 1879. Application for reissue filed March 18, 1880.

*To all whom it may concern:*

Be it known that I, FREDERICK STITZEL, of the city of Louisville, in the county of Jefferson and State of Kentucky, have invented certain new and useful Improvements in Racks for Tiering Barrels; and I do hereby declare that the following is a full, clear, and exact description of the construction and operation of the same, reference being had to the accompanying drawings, forming part of this specification, and to the letters of reference marked thereon.

This invention relates to racks for tiering barrels containing whisky or other fluid; and the object of the invention is to provide a portable rack or frame, made in sections, that will be sufficiently strong to bear the weight of as many barrels as may be tiered between the floors of the house without such barrels resting upon one another, thereby avoiding the danger of crushing the staves by the weight, as each tier is made to rest on separate rails projecting on the inside of the frame, independently of the others, permitting a free circulation of air between the barrels, and at the same time making it easy to remove any of the barrels in any of the tiers without interfering with those above or below. These racks are made of square pieces of timber of suitable size, and consist of four posts tenoned into two cross-pieces as a base, sufficiently wide apart to admit a barrel lengthwise loosely. To the inside of these posts three horizontal rails are secured, leaving sufficient space to permit a barrel to pass between them without touching the one above it. These rails, three to a side, are let into the inside of the posts about one-third of their breadth, leaving the remainder to project inwardly, so as to answer as ledges for the barrels to rest upon.

In order to secure the rails firmly to the posts, bolts are provided long enough to extend through the entire frame at each connection, said bolts having collars or screw-nuts on the inside and nuts on the outside, which hold them firmly, and also serve as means for connecting and holding the parts of the frame rigidly in position.

Figures 1, 2:
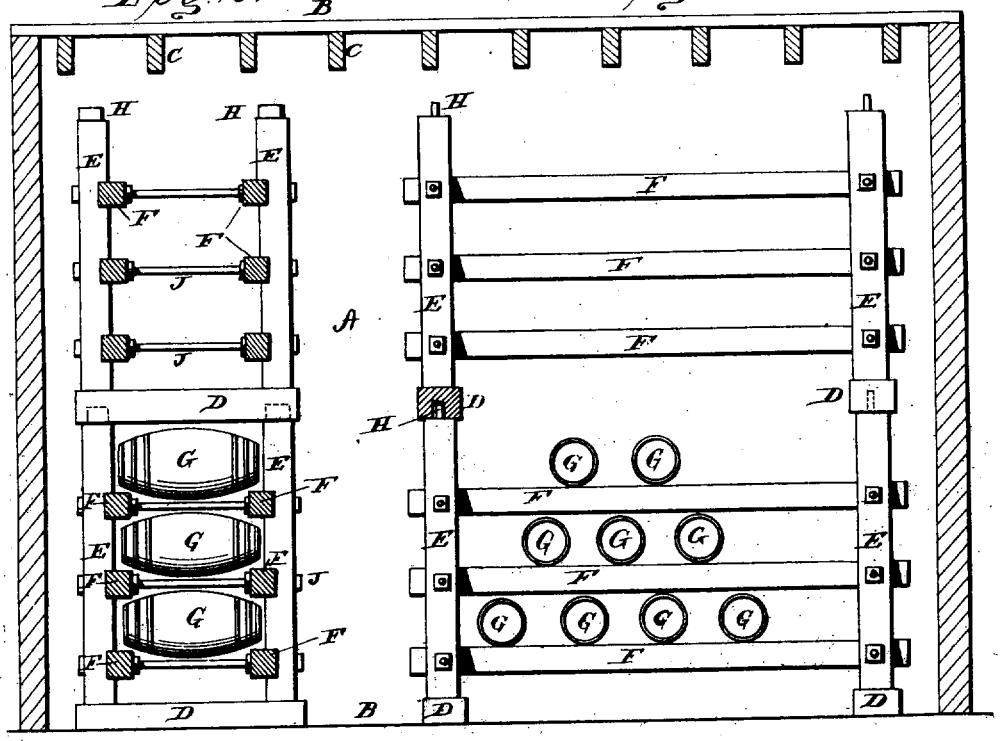
Figure 4:
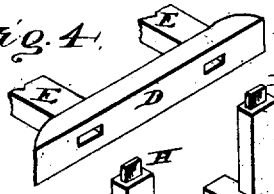
Figure 3:
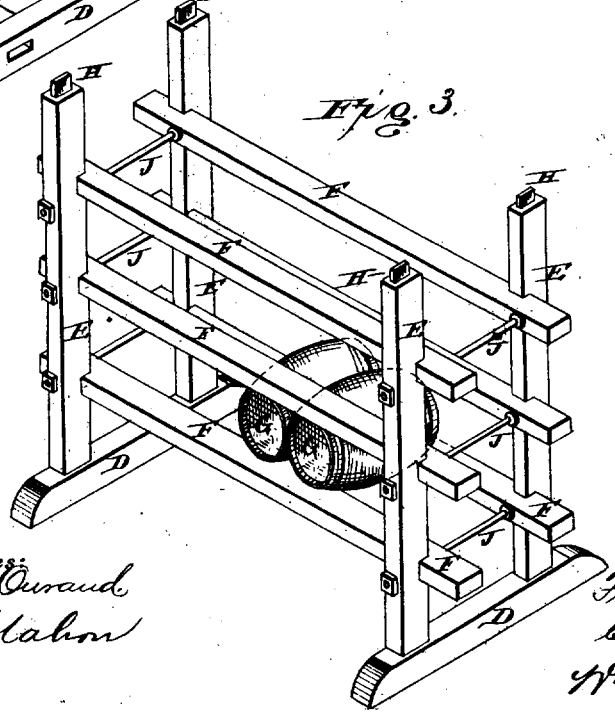

In the before-referred-to drawings, Figure 1 is a side view of the racks, showing the manner of arranging them in the house. Fig. 2 is a cross-sectional view thereof, showing the barrels and the projecting ledges of the rack on which they rest. Fig. 3 is a perspective view of a rack, showing its general construction; and Fig. 4 is a perspective view of the bottom of the mortised base, illustrating, in connection with the tenoned ends of the upright posts in Fig. 3, the mode of securing one rack or frame upon another.

The letter A designates the walls of a house, and B the floors thereof. C C are sections of joists. D D are the cross-pieces or base of the rack-frame. E E are the upright posts, which are made of square timber of suitable size, the lower ends of which are tenoned into the base-blocks D, and the upper ends of which are provided with tenons H, which enter corresponding mortises in the under side of the base-blocks D, as indicated by the sectional portions at the left of Fig. 1, the dotted lines elsewhere in said Fig. 1 and in Fig. 2, and the perspective view, Fig. 4, to hold the frames together when one is placed upon another.

F F are the horizontal rails of the rack, which are made of square or slightly flat pieces of timber, notched or let into the inside of the posts E about one-third of their size, leaving the remainder to project, to answer as a ledge for the barrels to rest upon. These rails are secured firmly to the posts by means of bolts J, passed through the entire frame at each joint, with collars or screw-nuts on the inside and nuts on the outside, which hold the frame firmly, and also serve as means for connecting the parts and holding the frame perfectly rigid while in use.

G G are the barrels in the racks.

The bolts J may be made either with nuts or collars on the inside, but with screw-nuts on the outside; or, if more convenient, screw-nuts may be used on both sides.

Although the above-named racks are intended to be made in independent sections, for the purpose of rendering them portable, and more especially adapted to ordinary warehouses, when necessary, as in the case of large store-houses, such as are now used by the revenue department for distillers, the stories of which are generally comparatively low, these racks may be enlarged, built in, and connected with the building in any manner most suitable, with passways between for convenience in removing the barrels, or their proper ventilation while in the racks.

Having thus described the nature and object of this my invention, what I claim as new, and desire to secure by Letters Patent, is—

1. In a barrel-rack having posts connected together and supported in an upright position, two or more pairs of horizontal rails secured to such posts and having portions projecting inwardly therefrom to form barrel ledges or rests, substantially as and for the purpose described.

2. In a barrel-rack, the combination of upright posts, their connecting bolts and bases, and two or more pairs of rails extending longitudinally of such rack, secured to the upright posts and projecting inwardly therefrom, to form ledges to support the barrels in separated rows or tiers, substantially as specified.

3. A rack composed of upright posts having end tenons, base-blocks having mortises in their under sides, and connecting rails and bolts, whereby one rack is adapted to be placed upon another, substantially as described.

To the above specification of my invention I have signed my name this 24th day of February, A. D. 1880.

FREDERICK STITZEL.

Witnesses:

C. W. LONG,

JACOB LAVAS.